United States Patent
Thorson (10) Patent No.: US 8,934,229 B2
(45) Date of Patent: Jan. 13, 2015

(54) ELECTRONICS DEVICE HAVING ROTATABLE PANELS CONFIGURED FOR DISPLAY AND ADAPTIVE INTERFACE

(75) Inventor: Brad Thorson, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1106 days.

(21) Appl. No.: 12/497,580

(22) Filed: Jul. 3, 2009

(65) Prior Publication Data

US 2011/0002096 A1    Jan. 6, 2011

(51) Int. Cl.
*H05K 5/00* (2006.01)
*H05K 7/00* (2006.01)
*G09G 5/00* (2006.01)
*H04N 5/225* (2006.01)
*G06F 1/16* (2006.01)

(52) U.S. Cl.
CPC ............ *G06F 1/1692* (2013.01); *G06F 1/1618* (2013.01); *G06F 1/1643* (2013.01); *G06F 1/1647* (2013.01); *G06F 2200/1634* (2013.01); *Y10S 248/917* (2013.01)
USPC ............ 361/679.27; 361/679.21; 361/679.26; 361/679.28; 361/679.44; 248/917; 345/659; 348/207.1

(58) Field of Classification Search
USPC ............ 361/679.21–679.27, 679.01, 679.02, 361/679.08, 679.09, 679.3, 679.55–679.59; 345/156, 157, 168, 169; 455/575.1; 248/917–924, 80–88, 155.1–155.5, 248/166–173, 180.1–186.2, 229.1–231.51, 248/271.4, 292.14, 316.1–316.8; 292/1–62, 292/113, 169.11–169.23, 341.11–341.19; 348/14.07, 51–52, 177, 348/333.01–333.13, 739
See application file for complete search history.

(56) References Cited

U.S. PATENT DOCUMENTS

| | | | |
|---|---|---|---|
| 5,790,371 A | 8/1998 | Latocha et al. | |
| 7,136,282 B1 * | 11/2006 | Rebeske | 361/679.55 |
| 7,656,661 B2 * | 2/2010 | Shaum | 361/679.55 |
| 7,821,780 B2 * | 10/2010 | Choy | 361/679.06 |
| 7,864,524 B2 * | 1/2011 | Ladouceur et al. | 361/679.55 |
| 2003/0098857 A1 | 5/2003 | Gettemy et al. | |
| 2003/0142469 A1 | 7/2003 | Ponx | |
| 2003/0213101 A1 | 11/2003 | Lin | |
| 2007/0080892 A1 | 4/2007 | Rebeske | |
| 2007/0285341 A1 | 12/2007 | Manning | |
| 2008/0247128 A1 | 10/2008 | Khoo | |
| 2008/0316689 A1 | 12/2008 | Moscovitch | |

(Continued)

FOREIGN PATENT DOCUMENTS

CN 19025963 1/2007
GB 2448981 A 11/2008

(Continued)

*Primary Examiner* — Jerry Wu
(74) *Attorney, Agent, or Firm* — Haverstock & Owens LLP (57) ABSTRACT

An electronics device includes a plurality of panels. A first panel includes device electronics positioned within a housing that functions as a protective cover. A second panel includes a touchscreen display on a display side and a housing on a backside. The second panel is coupled to the first panel using a first hinge mechanism, such as a reversible hinge. A third panel includes a touchscreen display configurable as an adaptive interface. The third panel is coupled to the second panel using a second hinge mechanism. The first panel, the second panel, and the third panel are coupled together as a "z-fold", and are movable into a plurality of different configurations.

51 Claims, 7 Drawing Sheets

(56) References Cited

U.S. PATENT DOCUMENTS

| | | |
|---|---|---|
| 2009/0102744 A1 | 4/2009 | Ram |
| 2009/0244001 A1* | 10/2009 | Nakai et al. .................. 345/156 |
| 2010/0149104 A1* | 6/2010 | Sim et al. ..................... 345/169 |
| 2010/0232096 A1* | 9/2010 | Chen ........................ 361/679.01 |
| 2010/0321275 A1* | 12/2010 | Hinckley et al. .............. 345/1.3 |

FOREIGN PATENT DOCUMENTS

| | | |
|---|---|---|
| JP | 04044154 A | 2/1992 |
| JP | 11065701 A | 3/1999 |
| JP | 2000322155 | 11/2000 |
| JP | 2005182020 | 7/2005 |
| JP | 2005266968 A | 9/2005 |
| WO | 2005067479 A2 | 7/2005 |

\* cited by examiner

ELECTRONICS DEVICE HAVING ROTATABLE PANELS CONFIGURED FOR DISPLAY AND ADAPTIVE INTERFACE

FIELD OF THE INVENTION

The present invention relates to the field of electronic devices. More specifically, the present invention relates to an electronics device having rotatable panels configured for display and adaptive interface.

BACKGROUND OF THE INVENTION

The use of electronics devices and mobile electronics devices continue to proliferate. Many different types of electronics devices are currently available. A laptop computer, also known as a notebook computer, is a personal computer designed for mobile use. A laptop includes most of the typical components of a desktop computer, including a display, a keyboard, a cursor control device such as a touchpad, speakers, and a battery. The laptop is configured as two panels that fold open and closed by a hinge. This is often referred to as a clamshell form factor. The first panel includes the display, and the second panel includes the remaining components including the keyboard, touchpad, and device electronics. The outer portions of each panel form a protective cover for the laptop when closed.

A tablet laptop computer is a variation of the laptop computer, having a complex joint between the two panels that enables the display panel to twist and then lay flat on the keyboard panel such that the display is facing outward although the two panels are folded together. The display panel in the tablet laptop has a touchscreen display.

A touchscreen is a display that detects the presence, location, and pressure of a touch within the display area, generally by a finger, hand, stylus, or other pointing device. The touchscreen enables a user to interact with the display panel directly without requiring any intermediate device, rather than indirectly with a keyboard, a mouse, or a touchpad. Touchscreens can be implemented in computers or as terminals to access networks. Touchscreens are commonly found in point-of-sale systems, automated teller machines (ATMs), mobile phones, personal digital assistants (PDAs), portable game consoles, satellite navigation devices, and information appliances.

There are a number of types of touchscreen technologies. A resistive touchscreen panel is composed of several layers including two thin metallic electrically conductive and resistive layers separated by thin space. When some object touches the touchscreen panel, the layers are connected at a certain point. In response to the object contact, the panel electrically acts similar to two voltage dividers with connected outputs. This causes a change in the electrical current that is registered as a touch event and sent to the controller for processing.

A capacitive touchscreen panel is coated, partially coated, or patterned with a material that conducts a continuous electrical current across a sensor. The sensor exhibits a precisely controlled field of stored electrons in both the horizontal and vertical axes to achieve capacitance. The human body is also an electrical device that has stored electrons and therefore also exhibits capacitance. When a reference capacitance of the sensor is altered by another capacitance field, such as a finger, electronic circuits located at each corner of the panel measure the resultant distortion in the reference capacitance. The measured information related to the touch event is sent to the controller for mathematical processing. Capacitive sensors can either be touched with a bare finger or with a conductive device being held by a bare hand. Capacitive sensors also work based on proximity, and do not have to be directly touched to be triggered. In most cases, direct contact to a conductive metal surface does not occur and the conductive sensor is separated from the user's body by an insulating glass or plastic layer. Devices with capacitive buttons intended to be touched by a finger can often be triggered by quickly waving the palm of the hand close to the surface without touching.

Other types of touchscreen technologies include surface acoustic wave technology that uses ultrasonic waves, an infrared touchscreen panel, strain gauge panels coupled to springs, optical imaging, dispersive signal technology, and total internal reflection.

Electronic paper, also called e-paper, is a display technology designed to mimic the appearance of ordinary ink on paper. Electronic paper reflects ambient light similarly to ordinary paper, as opposed to a conventional flat panel display that uses a backlight to illuminate the pixels. Once a display image is painted on the display surface, electronic paper is capable of holding the display image indefinitely without drawing electricity. Electronic paper can be built using several different technologies, including, but not limited to, electrophoretic displays, electro-wetting displays, and cholesteric liquid crystal displays (LCD). Electronic paper produces a stable image using a relative low amount of power since the displayed image does not need to be refreshed and the displayed image is viewed without using a backlight. Applications include e-book readers capable of displaying digital versions of books, magazines, and other traditionally printed materials.

SUMMARY OF THE INVENTION

An electronics device includes a plurality of panels. A first panel includes device electronics positioned within a housing that functions as a protective cover. A second panel includes a touchscreen display on a display side and a housing on a backside. The second panel is coupled to the first panel using a first hinge mechanism, such as a reversible hinge. A third panel includes a touchscreen display configurable as an adaptive interface. The third panel is coupled to the second panel using a second hinge mechanism. The first panel, the second panel, and the third panel are coupled together as a "z-fold", and are movable into a plurality of different configurations.

In a first aspect, an electronics device includes a first panel comprising a housing and a device processing unit, a second panel rotatably coupled to the first panel, wherein the second panel comprises a first touchscreen display, and a third panel rotatably coupled to the second panel, wherein the third panel comprises a second touchscreen display, further wherein when the first panel, the second panel, and the third panel are positioned in a workstation configuration the first touchscreen display and the second touchscreen display are exposed, and the second touchscreen display is configured as a touch-sensitive keyboard, when the first panel, the second panel, and the third panel are positioned in a tablet laptop configuration the second touchscreen display is covered by the first panel and the second panel, and the first touchscreen display is exposed and configured as a tablet laptop touchscreen, and when the first panel, the second panel, and the third panel are positioned in a reader configuration the first touchscreen display is covered by the first panel and the third panel, and the second touchscreen display is exposed and configured as a reader.

In a second aspect, an electronics device includes a first panel comprising a housing and a device processing unit, a second panel rotatably coupled to the first panel, wherein the second panel comprises a first touchscreen display, and a third panel rotatably coupled to the second panel, wherein the third panel comprises a second touchscreen display, further wherein the first panel, the second panel, and the third panel are rotatable into a plurality of configurations, in a workstation configuration the second panel and the third panel are open relative to each other and the first touchscreen display and the second touchscreen display are exposed, in a tablet laptop configuration the first panel, the second panel, and the third panel are folded closed and the first touchscreen display is exposed, and in a reader configuration the first panel, the second panel, and the third panel are folded closed and the second touchscreen display is exposed.

In either the first aspect or the second aspect, the second panel includes a back side comprising a protective cover and a display side comprising the first touchscreen display. The first panel, the second panel, and the third panel are movable into a closed configuration with the third panel positioned between the second side of the second panel and the first panel. In the workstation configuration the back side of the second panel is exposed. In the workstation configuration the back side of the second panel is in contact with and covered by the first panel. The third panel includes a first side comprising the second touchscreen display and a second side. In the tablet laptop configuration the first side of the third panel is in contact with the first panel, and the back side of the second panel is in contact with the second side of the third panel. In the reader configuration the second side of the third panel is in contact with the back side of the second panel, and the display side of the second panel is in contact with the first panel. The electronics device also includes a first reversible hinge to couple the first panel to the second panel, and a second reversible hinge to couple the second panel to the third panel. In some embodiments, the electronics device can also include a first position switch to determine an angular position of the first panel relative to the second panel, and a second position switch to determine an angular position of the third panel relative to the second panel. In other embodiments, the electronics device can also include a plurality of pressure-sensitive sensors coupled to the first panel, the second panel, and the third panel to determine a relative position of each of the first panel, the second panel, and the third panel. In the workstation configuration the first touchscreen display and the second touchscreen display are both powered on. In the tablet laptop configuration the first touchscreen display is powered on and the second touchscreen display is powered off. In the reader configuration the first touchscreen display is powered off and the second touchscreen display is powered on. In the workstation configuration the first touchscreen display is configured as display-only with any touch-sensitive functionality disabled, and the second touchscreen display is configured as a touch-sensitive keyboard. In some embodiments, the second touchscreen display can be an LCD touchscreen display. In some embodiments, the third panel can be electronic paper.

In a third aspect, a method of configuring and using an electronics device is disclosed. The method includes rotatably coupling a first panel to a second panel, wherein the first panel comprises a housing and a device processing unit, and the second panel comprises a first touchscreen display, rotatably coupling a third panel to the second panel, wherein the third panel comprises a second touchscreen display, and rotating the first panel, the second panel, and the third panel into a plurality of configurations, in a workstation configuration the second panel and the third panel are open relative to each other and the first touchscreen display and the second touchscreen display are exposed, in a tablet laptop configuration the first panel, the second panel, and the third panel are folded closed and the first touchscreen display is exposed, and in a reader configuration the first panel, the second panel, and the third panel are folded closed and the second touchscreen display is exposed. The first panel, the second panel, and the third panel are also movable into a closed configuration with the third panel positioned between the second side of the second panel and the first panel. The method can also include determining an angular position of the first panel relative to the second panel, and determining an angular position of the third panel relative to the second panel. The method can also include determining a relative position of each of the first panel, the second panel, and the third panel.

Other features and advantages will become apparent after reviewing the detailed description of the embodiments set forth below.

BRIEF DESCRIPTION OF THE DRAWINGS

The electronics device having rotatable panels is described relative to the several views of the drawings. Where appropriate and only where identical elements are disclosed and shown in more than one drawing, the same reference numeral will be used to represent such identical elements.

DETAILED DESCRIPTION OF A PREFERRED EMBODIMENT

Reference will now be made in detail to the embodiments of the multi-panel electronics device, examples of which are illustrated in the accompanying drawings. While the multi-panel electronics device will be described in conjunction with the embodiments below, it will be understood that they are not intended to limit the multi-panel electronics device to these embodiments and examples. On the contrary, the multi-panel electronics device is intended to cover alternatives, modifications and equivalents, which may be included within the spirit and scope of the multi-panel electronics device as defined by the appended claims. Furthermore, in the following detailed description of the multi-panel electronics device, numerous specific details are set forth in order to more fully illustrate the multi-panel electronics device. However, it will be apparent to one of ordinary skill in the prior art that the multi-panel electronics device may be practiced without these specific details. In other instances, well-known methods and procedures, components and processes have not been described in detail so as not to unnecessarily obscure aspects of the multi-panel electronics device.

Embodiments are directed to an electronics device including a plurality of panels. A first panel includes device electronics positioned within a housing. The housing functions as a protective cover. The device electronics include a processing unit, a memory, a network interface, a power supply, and one or more display driver circuits. In some embodiments, the first panel is configured similarly to a comparable device electronics panel of a laptop computer without the keyboard. A second panel includes a touchscreen display on a display side and a housing on a backside. The second panel is coupled to the first panel using a first hinge mechanism. In some embodiments, the first hinge mechanism is a reversible hinge. In some embodiments, the second panel is configured as a touch-sensitive LCD screen. A third panel includes a touchscreen display configurable as an adaptive interface. The third panel is coupled to the second panel using a second hinge mechanism. In some embodiments, the second hinge mechanism is a reversible hinge. In some embodiments, the third panel is made of touch-sensitive electronic paper. The first panel, the second panel, and the third panel are coupled together as a "z-fold".

The three panels are able to be deployed in a variety of different positions relative to one another to enable one of a plurality of adaptive interface configurations and modes of operation. The first panel is rotatable relative to the second panel, and the third panel is rotatable relative to the second panel. One or more first position switches or sensors monitor a position of the first panel relative to the second panel, and one or more second position switches or sensors monitor a position of the third panel relative to the second panel. In one embodiment, the three panels are rotatable into at least four different configurations. In a closed configuration, the third panel is rotated closed against the second panel, and the first panel is rotated closed against third panel so that the third panel is positioned between the first panel and the second panel. The backside of the second panel includes a protective housing. In the closed configuration, the backside of the second panel and the housing of the first panel form a "clamshell" protective cover, similar to a conventional laptop computer in the closed position.

In a workstation configuration, the first panel is rotated at least 45 degrees away from a display side of the second panel, and the second panel is rotated to an "open" position relative to the third panel. In some embodiments, the first panel is essentially rotated 360 degrees relative to the closed configuration so that the first panel is positioned against the backside of the second panel. In other embodiments, the third panel is rotated a sufficient degree to enable the third panel to rotate against and away from the second panel. The second panel is rotated to form a "V" position relative to the second panel so that the third panel can be used as a user interface and the display side of the second panel is used as a display. The relative positions of the second panel and the third panel in the workstation configuration are similar to an "open" position of a conventional laptop computer. In the workstation configuration, the third panel is configured so as to provide a user interface. As the third panel is a touchscreen display, the configuration of the user interface is adaptable. For example, in some embodiments, a conventional laptop keyboard configuration is "displayed" on the third panel, and as the third panel is touch-sensitive, the "displayed" keyboard is used by the user in a manner similar to a keyboard of a conventional laptop computer. In the workstation configuration, the second panel is configured to function as a display where any touch-sensitive functionality is disabled.

In a reader configuration, the first panel is rotated closed against the display side of the second panel so that the display side of the second panel is covered by the first panel, and the third panel is rotated closed against the backside of the second panel. In the reader configuration, a touchscreen display on one side of the third panel is facing the user, and the touchscreen display is configured as a "reader". In some embodiments, the touchscreen display also displays user interface "buttons" used to page up or page down through a document being displayed by the "reader", and also to access menu features used to search and select documents to be "read". When in the menu function, the third panel displays the relative menu items and/or directories. In other embodiments, the user interface buttons are not included on the third panel display, but instead are implemented as hard features on a side of either the first panel or the third panel.

In a tablet laptop configuration, the third panel is rotated closed against the back side of the second panel, and the first panel is rotated closed against the third panel so that the third panel is positioned between the first panel and the second panel. The difference between the tablet laptop configuration and the closed configuration is that in the tablet laptop configuration, the third panel is positioned against the backside of the second panel and a first side of the first panel is positioned against the third panel, whereas in the closed configuration the third panel is positioned against the display side of the second panel and a second side of the first panel is positioned against the third panel. In the tablet laptop configuration, the display side of the second panel is exposed and both the display and touch-sensitive functionality is enabled.

The touchscreen display of the second panel and the touchscreen display of the third panel are configured to accommodate different types of display attributes, and as such have different power requirements. The touchscreen display of the second panel is configured to display multimedia data, that may be frequently changed or updated, such as when viewing video or accessing the internet. This requires active painting of the display at a relatively high refresh rate, for example at least 60 Hz. The touchscreen display of the third panel however is configured to provide display images that are relatively persistent. For example, in the reader configuration, each page is initially painted on the display, but is not repainted until a page change or other user signal is received. In this sense, the display image stays persistent and is passively painted. The same is true for a user interface displayed on the third panel while in the workstation configuration. Such persistent display attributes require much less power than the active painting performed on the second panel. As such, the power requirements for the touchscreen display of the second panel are greater than the power requirements for the touchscreen display of the third panel. Additionally, in the embodiments where the touchscreen display of the second panel is an LCD display and the touchscreen display of the third panel is electronic paper, the LCD display uses backlighting, whereas electronic paper does not. Electronic paper uses reflected ambient light. In this application, the power requirements of the second panel are higher yet compared to those of the third panel.

Figure 1:
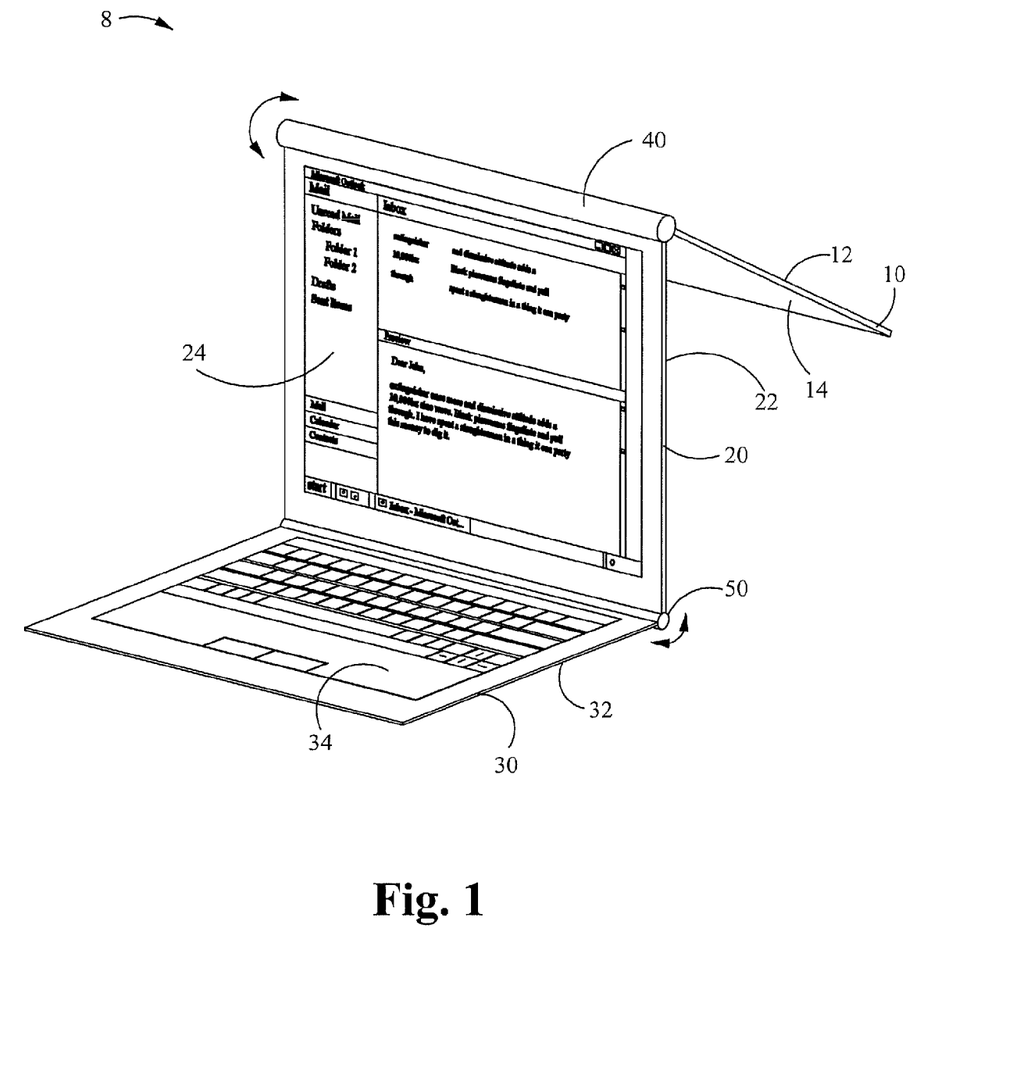
FIG. 1 illustrates a perspective view of an electronics device according to some embodiments.

FIG. 1 illustrates a perspective view of an electronics device according to some embodiments. The electronics device 8 includes three panels, a first panel 10, a second panel 20, and a third panel 30. The first panel 10 is coupled to the second panel 20 via a hinge mechanism 40. The second panel 20 is coupled to the third panel 30 via a hinge mechanism 50. In some embodiments, each of the hinge mechanisms 40 and 50 are reversible hinges. The hinge mechanism 40 provides any degree of rotation between a first position and a second position, which substantially provides 360 degrees of relative rotation between the first panel 10 and the second panel 20. The first position coincides with a first side 12 of the first panel 10 positioned against a display side 24 of the second panel 20. The second position coincides with a second side 14 of the first panel 10 positioned against a backside 22 of the second panel 20. The hinge mechanism 50 similarly provides any degree of rotation between a first position and a second position, which substantially provides 360 degrees of relative rotation between the third panel 30 and the second panel 20. The first position coincides with a first side 34 of the third panel 30 positioned against the display side 24 of the second panel 20. The second position coincides with a second side 32 of the third panel 30 positioned against the backside 22 of the second panel 20.

The first panel 10 includes a protective housing including the first side 12 and the second side 14. Device electronics are positioned within the housing, as described in greater detail below. The backside 22 of the second panel 20 includes a protective housing. The display side 24 includes a touchscreen display. In some embodiments, the touchscreen display is an LCD touchscreen display. In other embodiments, any other conventional touchscreen display technology can be used.

The first side 34 of the third panel 30 includes a touchscreen display. In some embodiments, the third panel 30 is electronic paper, and the first side 34 of the electronic paper is configured as a passively painted, persistently displayed touchscreen display. In this configuration, no backlight is used to illuminate the display surface. Instead, illumination is provided by reflected ambient light. Additionally, the image displayed on the first side 34 is passively painted, meaning that once the image is initially painted onto the display surface, the image is not re-painted unless a new image is to be displayed. In other words, the touchscreen display on the first side 34 has a refresh rate of zero, and an image displayed on the display surface is persistent until a user initiated command is received to paint a new image.

The touchscreen displays of both the second panel 20 and the third panel 30 are configured as adaptive interfaces that change form and function depending on an operational mode of the electronics device 8. The operational mode is determined by the rotational positions of the first panel 10, the second panel 20, and the third panel 30 relative to each other. In some embodiments, four different configurations of the electronics device 8 are enabled. The four configurations includes a closed configuration, a workstation configuration, a reader configuration, and a tablet laptop configuration.

Figure 2:
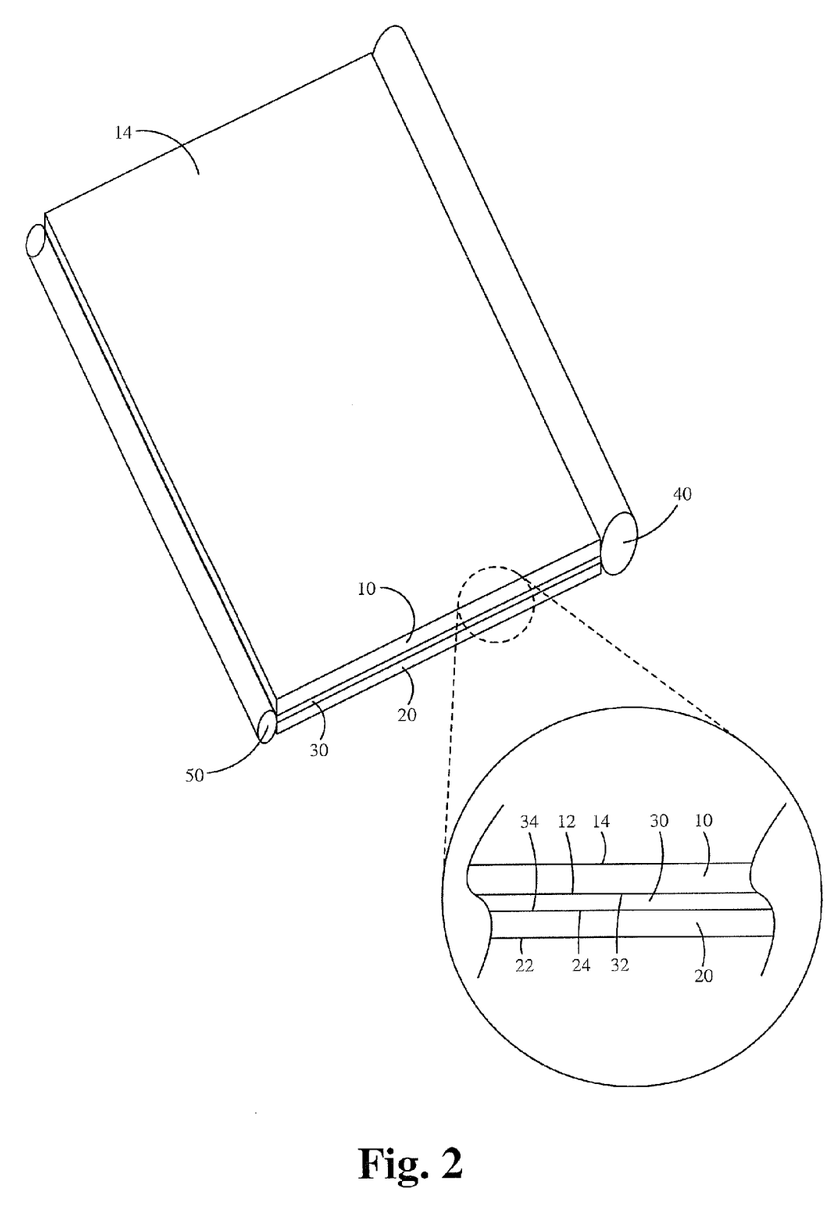
FIG. 2 illustrates the electronics device in the closed configuration.

FIG. 2 illustrates the electronics device 8 in the closed configuration. As shown in FIG. 2, the third panel 30 is positioned between the first panel 10 and the second panel 20. Specifically, the first side 34 of the third panel 30 is positioned against the display side 24 of the second panel 20, and the second side 32 of the third panel 30 is positioned against the first side 12 of the first panel 20. In some embodiments, the hinge mechanism 40 includes a spindle with a diameter sufficiently large to enable the third panel 30 to fit between the first panel 10 and the second panel 20 in the closed configuration. The second side 14 of the first panel 10 and the backside 22 of the second panel 20 form a "clamshell" protective covering. In the closed configuration, the electronics device 8 is powered down, or placed in hibernation, in which case the touchscreen display on the second panel 20 and the touchscreen display on the third panel 30 are powered down.

Figure 3:
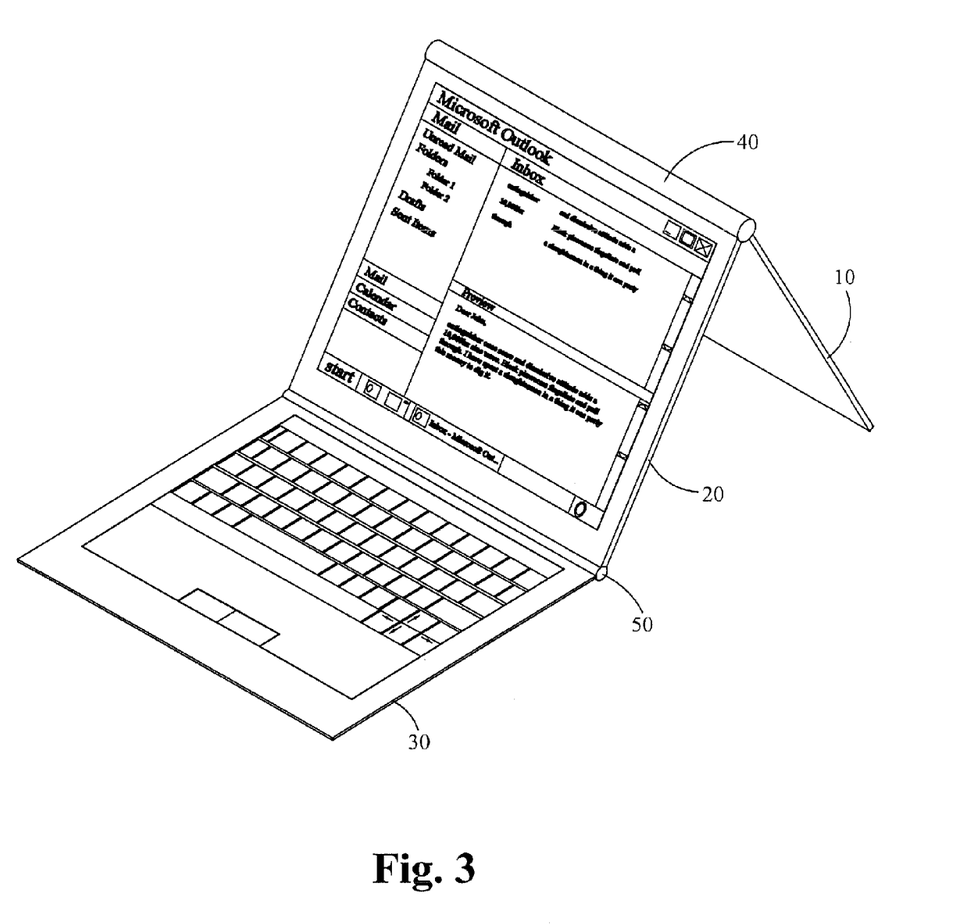
FIG. 3 illustrates the electronics device in the workstation configuration.

FIG. 3 illustrates the electronics device 8 in the workstation configuration. In the workstation configuration, the touchscreen display on the first side 34 of the third panel 30 and the touchscreen display on the display side 24 of the second panel 20 are both uncovered, and are therefore powered on, and the touchscreen displays are positioned so as to be both viewable to a single user. The third panel 30 is "open" relative to both the first panel 10 and the second panel 20. In other words, the third panel 30 is not positioned against either the first panel 10 or the second panel 20. As shown in FIG. 3, the first panel 10 is also "open" relative to both the second panel 20 and the third panel 30. This is for exemplary purposes only. The actual position of the first panel 10 is any position that does not cover either the display side 24 of the second panel 20 or the third panel 30, and also does not block the view of the display side 24 of the second panel 20. In some embodiments, the first panel 10 is rotated at least 45 degrees away from the display side 24 of the second panel 20. In some embodiments, the first panel 10 is rotated essentially 360 degrees relative to the closed configuration so that the second side 14 of the first panel 10 is positioned against the backside 22 of the second panel 20. In other embodiments, the first panel 10 is rotated a sufficient degree to enable the third panel 30 to rotate against and away from the second panel 20.

The third panel 30 is rotated to form a "V" position relative to the second panel 20 so that the first side 34 of the third panel 30 is used as a user interface and the display side 24 of the second panel 20 is used as a display. The relative positions of the second panel 20 and the third panel 30 in the workstation configuration are similar to an "open" position of a conventional laptop computer. In the workstation configuration, the third panel 30 is configured so as to provide a user interface. As the third panel 30 is a touchscreen display, the configuration of the user interface is adaptable. For example, in some embodiments, a conventional laptop keyboard and touchpad configuration is "displayed" on the first side 34 of the third panel 30. Since the first side 34 of the third panel 30 is touch-sensitive, the "displayed" keyboard and touchpad are used by the user in a manner similar to a keyboard of a conventional laptop computer. In the workstation configuration, the display side 24 of the second panel 20 is configured to function as a display where any touch-sensitive functionality is disabled. The touchscreen display on the third panel 30 can alternatively be configured to "display" a customized keyboard-type user interface, or any other customized user interface that enables the user to input control commands to the electronics device 8 by touching the touchscreen display.

Figure 4A:
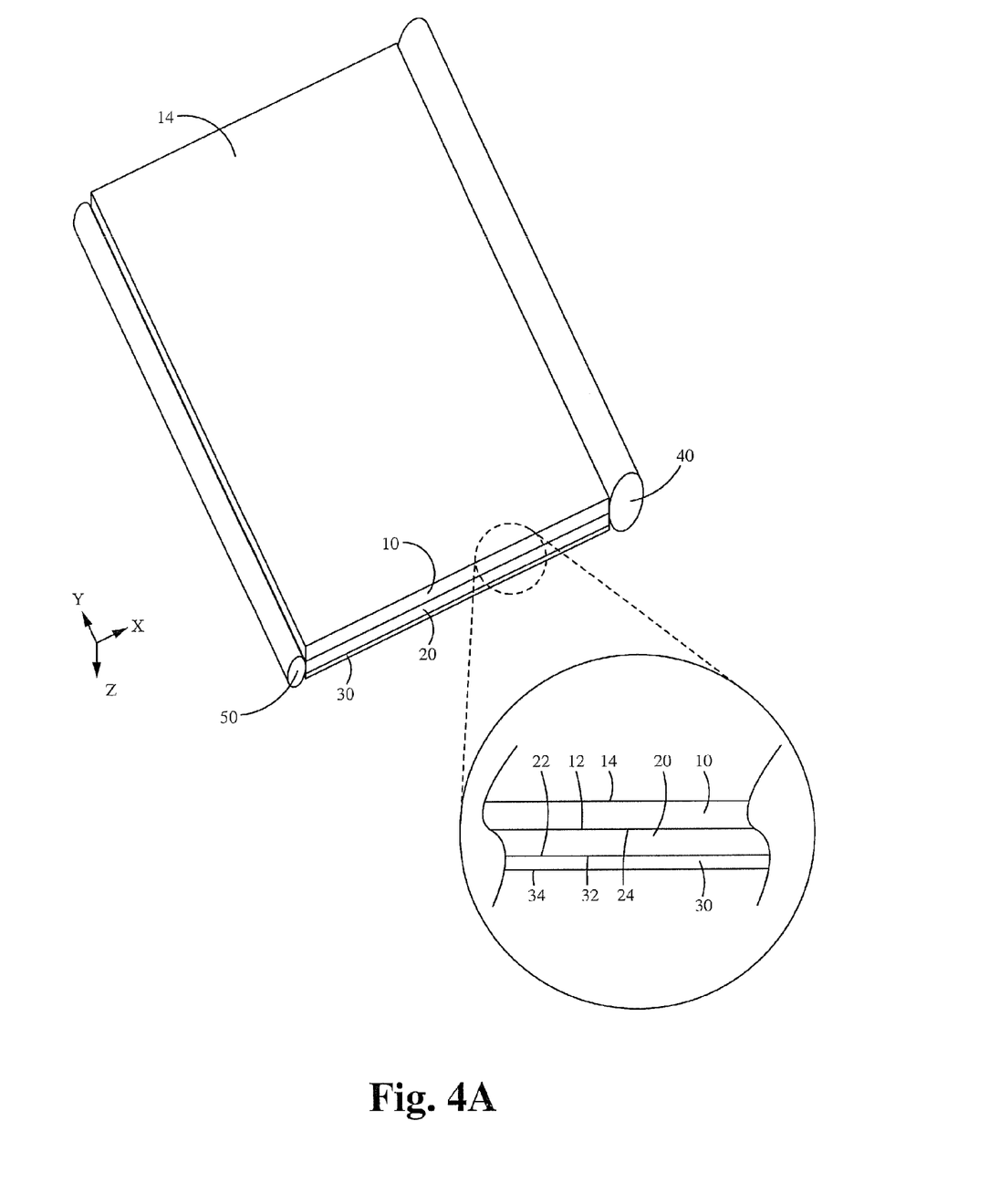
FIG. 4A illustrates the electronics device in the reader configuration.
Figure 4B:
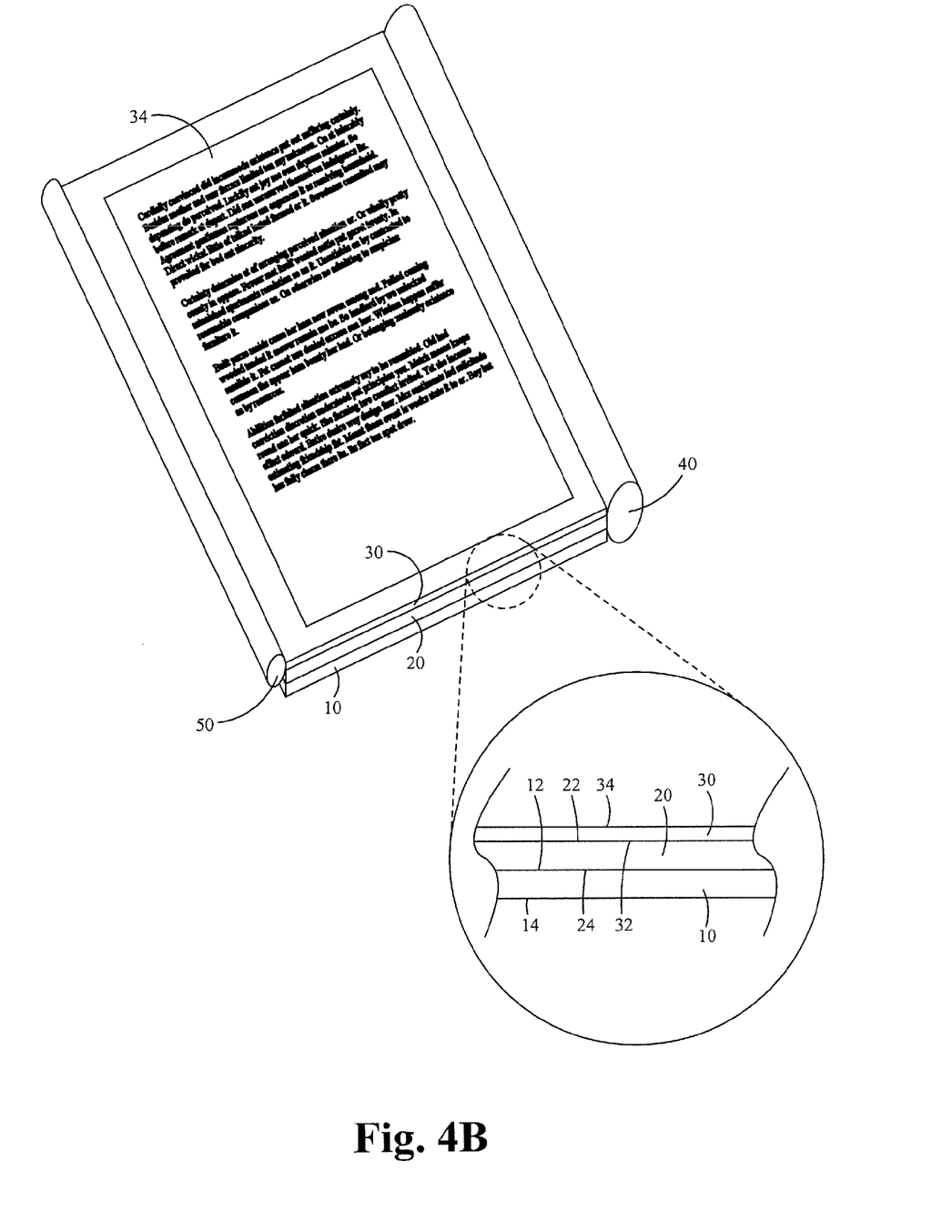
FIG. 4B illustrates the electronics device in the reader configuration and rotated 180 degrees about the x-axis relative to the position of the electronics device in FIG. 4A.

FIG. 4A illustrates the electronics device 8 in the reader configuration. As shown in FIG. 4A, the second panel 20 is positioned between the first panel 10 and the third panel 30. Specifically, the first side 12 of the first panel 10 is positioned against the display side 24 of the second panel 20, and the second side 32 of the third panel 30 is positioned against the backside 22 of the second panel 20. The second side 14 of the first panel 10 is uncovered. The display side 24 is covered and therefore powered down, and the touchscreen display on the first side 34 of the third panel 30 is uncovered and therefore powered on. In use, a user positions the electronics device 8 with the first side 34 of the third panel 30 facing upward, as in facing the user, which is shown in FIG. 4B. The position of the electronics device 8 in FIG. 4B is rotated 180 degrees about the x-axis relative to the position of the electronics device 8 in FIG. 4A. In the reader configuration, the touchscreen display on the first side 34 is configured as a reader, where one or more pages of a document are displayed as a display image. In some embodiments, the refresh rate is set to zero such that the display image is painted only once, and persists until a control command is received to paint a new image. In other embodiments, the refresh rate is set at a level greater than zero. In some embodiments, the displayed image also includes user interface buttons, which due to the touch-sensitive nature of the touchscreen display enables the user to, for example, page up, page down, or access and select menu options.

Figure 5:
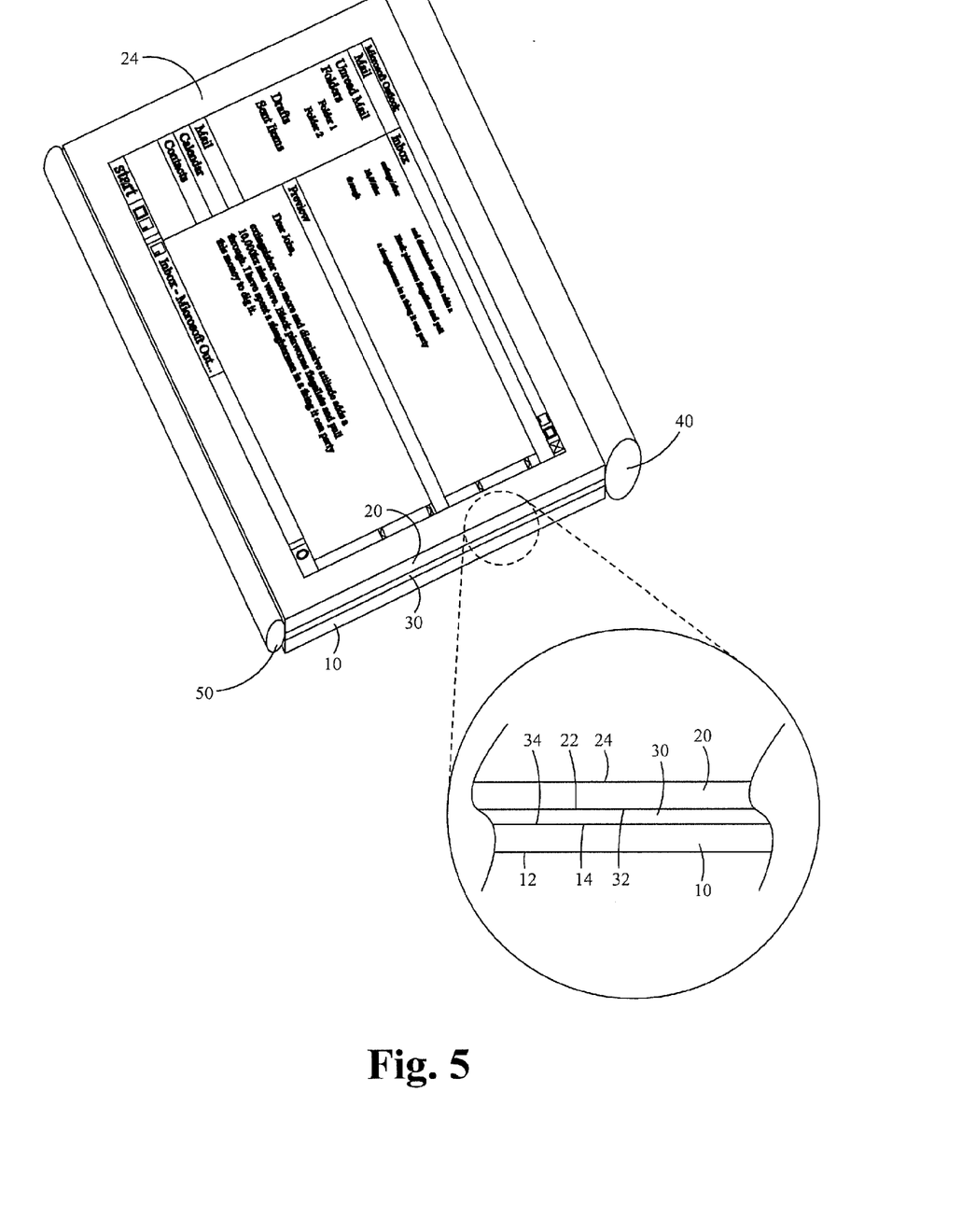
FIG. 5 illustrates the electronics device in the tablet laptop configuration.

FIG. 5 illustrates the electronics device 8 in the tablet laptop configuration. As shown in FIG. 5, the third panel 30 is positioned between the first panel 10 and the second panel 20.

The difference between the tablet laptop configuration and the closed configuration is that in the tablet laptop configuration the third panel 30 is positioned against the backside 22 of the second panel 20, and the second side 14 of the first panel 10 is positioned against the third panel, whereas in the closed configuration the third panel 30 is positioned against the display side 24 of the second panel 20, and the first side 12 of the first panel 10 is positioned against the third panel 30. Specifically, in the tablet laptop configuration, the second side 14 of the first panel 10 is positioned against the first side 34 of the third panel 30, and the second side 32 of the third panel 30 is positioned against the backside 22 of the second panel 20. The first side 12 of the first panel 10 is uncovered. The touchscreen display on the first side 34 of the third panel 30 is covered and therefore powered down, and the display side 24 is uncovered and therefore powered on. In the tablet laptop configuration, the touchscreen display on the display side 24 of the second panel 20 is configured as a tablet laptop where both the display and touch-sensitive functionality are enabled. As a tablet laptop, the electronics device 8 is configured to provide similar functionality as a conventional laptop computer.

Figure 6:
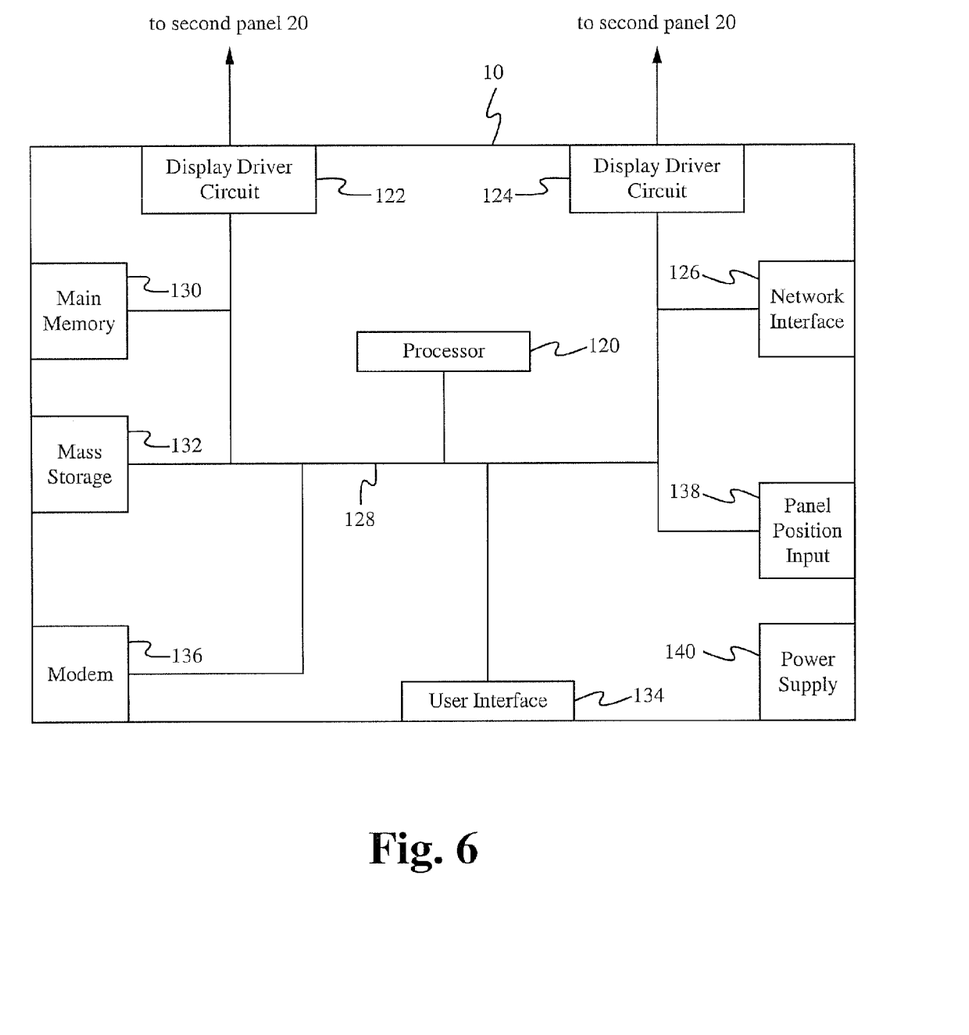
FIG. 6 illustrates an exemplary block diagram of the internal components of the first panel.

An exemplary block diagram of the internal components of the first panel 10 is illustrated in FIG. 6. The first panel 10 includes a processor 120, a main memory 130, a panel position input 138, a mass storage device 132, a modem 136, a network interface circuit 126, a display driver circuit 122, a display driver circuit 124, a user interface 134, all coupled together by a conventional bidirectional system bus 128. The first panel 10 also includes a power supply 140 used to power the electronics device 8, including each of the first panel 10, the second panel 20, and the third panel 30. The network interface circuit 126 provides an interface for sending and receiving communications over a network connection. In some embodiments, the network interface circuit 128 is implemented on a network interface card within the first panel 10. However, it should be apparent to those skilled in the art that the network interface circuit 126 can be implemented within the first panel 10 in any other appropriate manner, including building the interface circuit onto the motherboard itself. It should also be apparent to those skilled in the art that one or more network connections can be provided by the network interface circuit 126. The network interface circuit 126 provides a preferred high-speed connection to a network. Alternatively, the modem 136 provides a dial-up connection via the public switched telephone network (PSTN) to access the network. The mass storage device 132 may include both fixed and removable media using any one or more of magnetic, optical or magneto-optical storage technology or any other available mass storage technology. The system bus 128 contains an address bus for addressing any portion of the memory 132 and 130. The system bus 128 also includes a data bus for transferring data between and among the processor 120, the main memory 130, the panel position input 138, the mass storage device 132, the modem 136, the network interface circuit 126, the display driver circuit 122, the display driver circuit 124, and the user interface 134.

The user interface 134 includes a power on/off switch. In some embodiments, the user interface also includes user interface buttons for providing user control signals, such as page up, page down, and menu options when in the reader configuration. In some embodiments, the user interface also includes a port for connecting to a conventional mouse used for manipulating graphic images on the active display as a cursor control device.

In some embodiments, the network interface circuit 126 is configured with a card slot to accept a card-style cellular and/or Wi-Fi phone that enables a user to use the electronics device 8 as a telephone. Such a card-style phone also provides the user with a limited feature phone when removed from the network interface circuit 126.

In some embodiments, the rotational position of the first panel 10 relative to the second plane 20 is determined by a position switch incorporated within the hinge mechanism 40, and the rotational position of the third panel 30 relative to the second plane 20 is determined by a position switch incorporated within the hinge mechanism 50. The position switches are coupled to the panel position switch input 138 of the first panel 10 to provide relative positional data of the first panel 10, the second panel, 20, and the third panel 30 to the processor 120. In other embodiments, pressure-sensitive sensors are positioned at various locations on one or more of the three panels 10, 20, and 30 and are used to determine if each side of each panel 10, 20, and 30 is exposed or covered.

Using the relative positional data or the pressure-sensitive data, the processor 120 determines whether the electronics device 8 is in the closed configuration, the workstation configuration, the reader configuration, or the tablet laptop configuration. Once the current configuration is determined, the appropriate control signals are sent to the display driver circuits 122 and 124, which in turn provide the appropriate display driver signals to the touchscreen displays of the second panel 20 and the third panel 30. For example, the display driver signal provided to the touchscreen of the second panel 20 enables or disables the touch-sensitive functionality depending on if the electronics device 8 is in the tablet laptop configuration or the workstation configuration, respectively. The display driver signals also provide the display data to be displayed on the touchscreen displays. It is understood that other conventional methods of determining the positions of each panel and the corresponding electronic device configurations can be used.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:
1. An electronics device comprising:
 a. a first panel comprising a housing and a device processing unit;
 b. a second panel rotatably coupled to the first panel, wherein the second panel comprises a first touchscreen display; and
 c. a third panel rotatably coupled to the second panel, wherein the third panel comprises a second touchscreen display, further wherein when the first panel, the second panel, and the third panel are positioned in a workstation configuration, the first touchscreen display and the second touchscreen display are exposed, and the second touchscreen display is configured as a touch-sensitive keyboard, when the first panel, the second panel, and the third panel are positioned in a tablet laptop configuration, the second touchscreen display is covered by the first panel and the second panel, and the first touchscreen display is exposed and configured as a tablet laptop touchscreen, and when the first panel, the second panel, and the third panel are positioned in a reader configuration, the first touchscreen display is covered by the first panel and the third panel, and the second touchscreen display is exposed and configured as a reader.

2. The electronics device of claim 1 wherein the second panel further comprises a back side comprising a protective cover and a display side comprising the first touchscreen display.

3. The electronics device of claim 2 wherein the first panel, the second panel, and the third panel are movable into a closed configuration with the third panel positioned between the second side of the second panel and the first side of the first panel.

4. The electronics device of claim 2 wherein in the workstation configuration the back side of the second panel is exposed.

5. The electronics device of claim 2 wherein in the workstation configuration the back side of the second panel is in contact with and covered by the first panel.

6. The electronics device of claim 2 wherein the third panel further comprises a first side comprising the second touchscreen display and a second side.

7. The electronics device of claim 6 wherein in the tablet laptop configuration the first side of the third panel is in contact with the first panel, and the back side of the second panel is in contact with the second side of the third panel.

8. The electronics device of claim 6 wherein in the reader configuration the second side of the third panel is in contact with the back side of the second panel, and the display side of the second panel is in contact with the first panel.

9. The electronics device of claim 1 further comprising a first reversible hinge to couple the first panel to the second panel, and a second reversible hinge to couple the second panel to the third panel.

10. The electronics device of claim 1 further comprising a first position switch to determine an angular position of the first panel relative to the second panel, and a second position switch to determine an angular position of the third panel relative to the second panel.

11. The electronics device of claim 1 further comprising a plurality of pressure-sensitive sensors coupled to the first panel, the second panel, and the third panel to determine a relative position of each of the first panel, the second panel, and the third panel.

12. The electronics device of claim 1 wherein in the workstation configuration the first touchscreen display and the second touchscreen display are both powered on.

13. The electronics device of claim 1 wherein in the tablet laptop configuration the first touchscreen display is powered on and the second touchscreen display is powered off.

14. The electronics device of claim 1 wherein in the reader configuration the first touchscreen display is powered off and the second touchscreen display is powered on.

15. The electronics device of claim 1 wherein the second touchscreen display comprises an LCD touchscreen display.

16. The electronics device of claim 1 wherein the third panel comprises electronic paper.

17. An electronics device comprising:
 a. a first panel comprising a housing and a device processing unit;
 b. a second panel rotatably coupled to the first panel, wherein the second panel comprises a first touchscreen display; and
 c. a third panel rotatably coupled to the second panel, wherein the third panel comprises a second touchscreen display, further wherein the first panel, the second panel, and the third panel are rotatable into a plurality of configurations, in a workstation configuration the second panel and the third panel are open relative to each other and the first touchscreen display and the second touchscreen display are exposed, in a tablet laptop configuration the first panel, the second panel, and the third panel are folded closed and the first touchscreen display is exposed, and in a reader configuration the first panel, the second panel, and the third panel are folded closed and the second touchscreen display is exposed.

18. The electronics device of claim 17 wherein in the workstation configuration the first touchscreen display is configured as display-only with any touch-sensitive functionality disabled, and the second touchscreen display is configured as a touch-sensitive keyboard.

19. The electronics device of claim 17 wherein in the tablet laptop configuration the first touchscreen display is configured as a tablet laptop touchscreen.

20. The electronics device of claim 17 wherein in the reader configuration the second touchscreen display is configured as a reader.

21. The electronics device of claim 17 wherein the second panel further comprises a back side comprising a protective cover and a display side comprising the first touchscreen display.

22. The electronics device of claim 21 wherein the first panel, the second panel, and the third panel are movable into a closed configuration with the third panel positioned between the second side of the second panel and the first side of the first panel.

23. The electronics device of claim 21 wherein in the workstation configuration the back side of the second panel is exposed.

24. The electronics device of claim 21 wherein in the workstation configuration the back side of the second panel is in contact with and covered by the first panel.

25. The electronics device of claim 21 wherein the third panel further comprises a first side comprising the second touchscreen display and a second side.

26. The electronics device of claim 25 wherein in the tablet laptop configuration the first side of the third panel is in contact with the first panel, and the back side of the second panel is in contact with the second side of the third panel.

27. The electronics device of claim 25 wherein in the reader configuration the second side of the third panel is in contact with the back side of the second panel, and the display side of the second panel is in contact with the first panel.

28. The electronics device of claim 17 further comprising a first reversible hinge to couple the first panel to the second panel, and a second reversible hinge to couple the second panel to the third panel.

29. The electronics device of claim 17 further comprising a first position switch to determine an angular position of the first panel relative to the second panel, and a second position switch to determine an angular position of the third panel relative to the second panel.

30. The electronics device of claim 17 further comprising a plurality of pressure-sensitive sensors coupled to the first panel, the second panel, and the third panel to determine a relative position of each of the first panel, the second panel, and the third panel.

31. The electronics device of claim 17 wherein in the workstation configuration the first touchscreen display and the second touchscreen display are both powered on.

32. The electronics device of claim 17 wherein in the tablet laptop configuration the first touchscreen display is powered on and the second touchscreen display is powered off.

33. The electronics device of claim 17 wherein in the reader configuration the first touchscreen display is powered off and the second touchscreen display is powered on.

34. The electronics device of claim 17 wherein the second touchscreen display comprises an LCD touchscreen display.

35. The electronics device of claim 17 wherein the third panel comprises electronic paper.

36. A method of configuring and using an electronics device, the method comprising:
   a. rotatably coupling a first panel to a second panel, wherein the first panel comprises a housing and a device processing unit, and the second panel comprises a first touchscreen display;
   b. rotatably coupling a third panel to the second panel, wherein the third panel comprises a second touchscreen display; and
   c. rotating the first panel, the second panel, and the third panel into a plurality of configurations, wherein in a workstation configuration the second panel and the third panel are open relative to each other and the first touchscreen display and the second touchscreen display are exposed, wherein in a tablet laptop configuration the first panel, the second panel, and the third panel are folded closed and the first touchscreen display is exposed, and further wherein in a reader configuration the first panel, the second panel, and the third panel are folded closed and the second touchscreen display is exposed.

37. The method of claim 36 wherein in the workstation configuration the first touchscreen display is configured as display-only with any touch-sensitive functionality disabled, and the second touchscreen display is configured as a touch-sensitive keyboard.

38. The method of claim 36 wherein in the tablet laptop configuration the first touchscreen display is configured as a tablet laptop touchscreen.

39. The method of claim 36 wherein in the reader configuration the second touchscreen display is configured as a reader.

40. The method of claim 36 wherein the second panel further comprises a back side comprising a protective cover and a display side comprising the first touchscreen display.

41. The method of claim 40 wherein the first panel, the second panel, and the third panel are movable into a closed configuration with the third panel positioned between the second side of the second panel and the first side of the first panel.

42. The method of claim 40 wherein in the workstation configuration the back side of the second panel is exposed.

43. The method of claim 40 wherein in the workstation configuration the back side of the second panel is in contact with and covered by the first panel.

44. The method of claim 40 wherein the third panel further comprises a first side comprising the second touchscreen display and a second side.

45. The method of claim 44 wherein in the tablet laptop configuration the first side of the third panel is in contact with the first panel, and the back side of the second panel is in contact with the second side of the third panel.

46. The method of claim 44 wherein in the reader configuration the second side of the third panel is in contact with the back side of the second panel, and the display side of the second panel is in contact with the first panel.

47. The method of claim 36 further comprising determining an angular position of the first panel relative to the second panel, and determining an angular position of the third panel relative to the second panel.

48. The method of claim 36 further comprising determining a relative position of each of the first panel, the second panel, and the third panel.

49. The method of claim 36 wherein in the workstation configuration the first touchscreen display and the second touchscreen display are both powered on.

50. The method of claim 36 wherein in the tablet laptop configuration the first touchscreen display is powered on and the second touchscreen display is powered off.

51. The method of claim 36 wherein in the reader configuration the first touchscreen display is powered off and the second touchscreen display is powered on.

* * * * *